United States Patent
Alvarez et al.

(10) Patent No.: US 8,663,524 B2
(45) Date of Patent: Mar. 4, 2014

(54) CONTROLLED GEOMETRY COMPOSITE MICRO PELLETS FOR USE IN COMPRESSION MOLDING

(75) Inventors: Eduardo Alvarez, Evergreen, CO (US); Brian Lee Mueller, Winona, MN (US); Brett Allen Weishalla, Lewiston, MN (US)

(73) Assignee: Miller Waste Mills, Winona, MN (US)

( * ) Notice: Subject to any disclaimer, the term of this patent is extended or adjusted under 35 U.S.C. 154(b) by 779 days.

(21) Appl. No.: 12/478,647

(22) Filed: Jun. 4, 2009

(65) Prior Publication Data

US 2010/0291388 A1  Nov. 18, 2010

Related U.S. Application Data

(60) Provisional application No. 61/177,443, filed on May 12, 2009.

(51) Int. Cl.
*B29C 47/00* (2006.01)
*B29B 9/06* (2006.01)
*B29C 67/24* (2006.01)
*D02G 3/00* (2006.01)

(52) U.S. Cl.
USPC ... 264/177.17; 264/141; 264/142; 264/177.1; 264/177.2; 264/319; 264/320; 264/330; 264/331.11

(58) Field of Classification Search
USPC .............. 264/162, 177.1, 241, 319, 141, 148, 264/325, 176.1, 142, 177.17, 177.2, 320, 264/330, 331.11; 428/372, 397, 401, 407; 524/96, 493, 494, 495; 523/220, 221
See application file for complete search history.

(56) References Cited

U.S. PATENT DOCUMENTS

| 3,164,563 | A | * | 1/1965 | Maxwell et al. ............... 523/347 |
| 3,655,850 | A | * | 4/1972 | Woodham et al. ............ 264/118 |
| 4,493,917 | A | | 1/1985 | Bailleux et al. |
| 4,638,037 | A | | 1/1987 | Ward et al. |
| 4,814,224 | A | | 3/1989 | Geibel et al. |
| 5,032,674 | A | | 7/1991 | Köhler et al. |
| 5,068,142 | A | | 11/1991 | Nose et al. |
| 5,132,342 | A | * | 7/1992 | Chillous ........................ 523/513 |
| 5,155,161 | A | * | 10/1992 | Onishi et al. ................... 524/515 |
| 5,268,050 | A | | 12/1993 | Azari |
| 5,300,552 | A | | 4/1994 | Hindi et al. |
| 5,441,801 | A | * | 8/1995 | Deaner et al. ................. 428/326 |

(Continued)

OTHER PUBLICATIONS

Hartness, T. et al., "The characterization of low cost fiber reinforced thermoplastic composites produced by the DRIFT™ process," Composites: Part A: Applied Science and Manufacturing, Aug. 2001, vol. 32, pp. 1155-1160, ISSN 0010-4361.

(Continued)

*Primary Examiner* — Atul P. Khare
(74) *Attorney, Agent, or Firm* — Foley & Lardner LLP

(57) ABSTRACT

Compression molding methods of manufacturing a shaped article are provided. The methods include compression molding thermoplastic resin-based material to provide a molded article, where thermoplastic resin-based material comprises a plurality of controlled geometry pellets. The pellets include at least one generally flat face having a cross-sectional shape with a rectangular envelope having an aspect ratio of at least 1.5. The controlled geometry pellets may include a plurality of reinforcing particulates dispersed throughout the thermoplastic resin. The reinforcing particulates typically have a largest dimension which is no more than about 90% of the largest pellet dimension.

20 Claims, 1 Drawing Sheet

(56) References Cited

U.S. PATENT DOCUMENTS

| | | | |
|---|---|---|---|
| 5,447,793 A | 9/1995 | Montsinger | |
| 5,497,594 A * | 3/1996 | Giuseppe et al. | 52/843 |
| 5,514,745 A * | 5/1996 | Yoshino | 524/494 |
| 5,565,514 A | 10/1996 | Carlberg | |
| 5,580,918 A | 12/1996 | Morita et al. | |
| 5,679,456 A * | 10/1997 | Sakai et al. | 428/340 |
| 5,686,521 A | 11/1997 | Massengale et al. | |
| 5,824,410 A * | 10/1998 | Sakai et al. | 428/361 |
| 5,844,036 A | 12/1998 | Hughes | |
| 6,280,667 B1 * | 8/2001 | Koenig et al. | 264/68 |
| 6,315,456 B1 | 11/2001 | Tanimoto et al. | |
| 6,581,632 B2 | 6/2003 | Walpole et al. | |
| 6,602,293 B1 | 8/2003 | Biermann et al. | |
| 6,610,773 B1 | 8/2003 | Sundararaj et al. | |
| 6,658,990 B1 | 12/2003 | Henning et al. | |
| 6,725,634 B1 | 4/2004 | Palmqvist et al. | |
| 6,780,365 B2 | 8/2004 | Goldbach | |
| 6,840,520 B2 | 1/2005 | Faas et al. | |
| 7,253,230 B2 | 8/2007 | Damman et al. | |
| 7,290,562 B2 | 11/2007 | Kane | |
| 7,332,119 B2 * | 2/2008 | Riebel | 264/299 |
| 2005/0070658 A1 | 3/2005 | Ghosh et al. | |
| 2006/0251878 A1 | 11/2006 | Meakin et al. | |
| 2009/0078907 A1 | 3/2009 | Ekstrom et al. | |

OTHER PUBLICATIONS

International Search Report and Written Opinion for International Application No. PCT/US2009/047983, mail date Jun. 11, 2010, 7 pages.

Yoon, B.S. et al., "Continuous Glass-Fiber Reinforced nylon 6 by Using a New Impregnation Die," Polymer Composites, Oct. 1997, published online Apr. 15, 2004, vol. 18, vol. 5, pp. 656-662, ISSN 0272-8397.

* cited by examiner

A
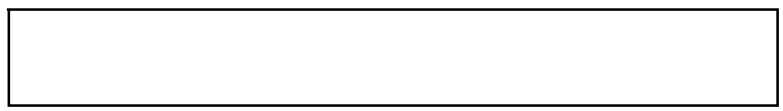
B
C
D
E

CONTROLLED GEOMETRY COMPOSITE MICRO PELLETS FOR USE IN COMPRESSION MOLDING

The present application claims the benefit of priority of U.S. Provisional Patent Application No. 61/177,443, entitled Controlled Geometry Composite Micro Pellets For Use In Compression Molding, filed on May 12, 2009, the disclosure of which is incorporated by reference herein in its entirety.

BACKGROUND

Compression molding is an important method for processing fiber-reinforced plastics to create a variety of products for nearly every industrial sector. Compression molding can be used to create products as diverse as engine covers, electrical generator covers, generator foundation and support panels, motor housings, snowmobile skis, gears, sheaves, sprockets, valve bodies, large seals, stock shapes (e.g., bars, tubes, rods and plates), simple geometry near-net shapes used for machining finished tight tolerance components, flat shaped articles with small curvatures and simple contours such as electrical enclosures, flat and curved shaped articles with and without metallic or ceramic inserts, body panels for golf carts, and transportation vehicle panels, all molded via a simple and predictable process with relatively minimal fiber breakage.

SUMMARY

The present application is directed to compression molding methods of manufacturing a shaped article. The methods include compression molding thermoplastic resin-based material to provide a molded article, where thermoplastic resin-based material comprises a plurality of controlled geometry pellets, which include thermoplastic polymeric resin. The controlled geometry pellets commonly have at least one generally flat face and, typically two opposing generally flat faces, which have a cross sectional shape having a rectangular envelope with an aspect ratio of at least 1.5. The pellets desirably may have a compression factor of no more than about 2.5 and, often, no more than about 2.2. Compression molded article is often machined to form a machined shaped article. The controlled geometry pellets may often include a plurality of reinforcing particulates dispersed throughout the thermoplastic resin. The reinforcing particulates typically have a largest dimension which is no more than about 90% of the largest pellet dimension. The pellets which are often employed in the present method may each have a volume of no more than about 50 $mm^3$, in some embodiments, no more than about 25 $mm^3$ and, in others, no more than about 10 $mm^3$.

Another embodiment provides a method of manufacturing a shaped article comprising compression molding thermoplastic resin-based material to provide a molded article; wherein thermoplastic resin-based material comprises a plurality of controlled geometry pellets, which include thermoplastic polymeric resin and reinforcing particulates. The pellets may have an axial length of no more than about 5 mm and a cross sectional shape having a rectangular envelope with an aspect ratio of at least about 1.5. The reinforcing particulates typically have a largest dimension which is no more than about 90% of the largest pellet dimension. In certain embodiments, reinforcing particulates typically have a largest dimension which is no more than about 90% of the width of the orifice of the die employed to produce such pellet via an extrusion operation. In the present compression molding operation, the controlled geometry pellets may all be substantially the same or of similar size. In some embodiments, however, it may be desirable to employ a plurality of controlled geometry pellets which include pellets of differing sizes, e.g., where the smallest and largest controlled geometry pellets have largest dimensions which may differ by an order of magnitude.

Another embodiment provides a method of manufacturing a shaped article comprising: compression molding thermoplastic resin-based material to provide a molded article; wherein thermoplastic resin-based material comprises a plurality of controlled geometry pellets, which include thermoplastic polymeric resin and reinforcing particulates. The thermoplastic resin-based material commonly comprises at least about 40 wt. % and often 50 wt. % or more of the controlled geometry pellets. The pellets may have an axial length of no more than about 5 mm and a cross sectional shape having a rectangular envelope with an aspect ratio of at least about 2. Preferably, the thermoplastic resin-based material has a compression factor of no more than about 2.2.

One embodiment provides a method of manufacturing a shaped article, which includes compression molding thermoplastic resin-based material to provide a molded article. The pellets comprise thermoplastic polymeric resin and may have an axial length of no more than about 5 mm and a cross sectional shape having a rectangular envelope with an aspect ratio of at least about 1.5 and more commonly about 2 to 30. The pellets may have an axial length/cross sectional width ratio (L:W) of about 0.25 to 30.

Certain embodiments are directed to composite pellets comprising thermoplastic polymeric resin; and reinforcing particulates, which have a largest dimension which is no more than about 90% of the largest pellet dimension. The composite pellets desirably have a compression factor of no more than about 2.5 and, in many instances, no more than about 2.2. The pellets preferably have a controlled geometry, e.g., have a cross sectional shape having a rectangular envelope with an aspect ratio (W:T) of at least about 1.5, and typically have an axial length/cross sectional width ratio (L:W) of about 0.25 to 30. In some embodiments, the thermoplastic polymeric resin may include polyetheretherketone (PEEK), polyetherimide, polyethersulfone, polyarylenesulfide polyetherketone (PEK), polyetherketoneketone (PEKK) polyetherketoneetherketoneketone (PEKEKK) and/or other arylether arylketone based polymers. Other suitable examples of thermoplastic polymers which may be employed include polyetherimide (PEI), polyethersulfone (PES), polyarylenesulfide (PAS), polyamideimide (PAI), polyphthalamide and other thermally stable thermoplastic polymers. The thermoplastic polymeric resin may suitably include blends of two or more thermoplastic polymers, such as those described above. The reinforcing particulates may include glass and/or carbon fibers (e.g., milled and/or chopped fibers). In certain embodiments, the controlled geometry pellets have a cross sectional shape with a rectangular envelope having an aspect ratio of about 2 to 10 and axial length/cross sectional width ratio (L:W) of about 0.5 to 3.

The use of controlled geometry pellets can lower manufacturing costs, improve properties in a single grade material, which can be used for compression molding and, in many instances, may also be used for injection molding and/or extrusion operations. The use of controlled geometry pellets can lower residual stress in compression molded articles and may permit compression molding of tight tolerance articles. Controlled geometry pellets typically exhibit complete polymer wet out of reinforcing fibers. In many instances, the present controlled geometry composite pellets may permit production of compression molded articles with very uniform structure and improved tensile, flexural and/or impact resistance properties.

BRIEF DESCRIPTION OF THE DRAWINGS

FIG. 1 shows examples of cross sections of a number of embodiments of the present composite pellets having A) rectangular, B) elliptical, C) triangular, D) hexagonal, and E) oblate elliptical cross sectional shapes. In FIGS. 1(B)-1(E) the rectangular envelope for the particular cross sectional shape is shown in dashed lines.

DETAILED DESCRIPTION

FIG. 1A shows a die face cross-section of one embodiment of a composite pellet of the present application, where the shape and dimensions of the pellet cross section are derived from the extrusion die through which the material is extruded. The thickness ("T") of the composite pellet is the narrow dimension of the perimeter of the rectangle (i.e, the height), and the width ("W") is the perpendicular and larger dimension of the perimeter of the rectangular envelope. The axial length ("L") of the composite pellet is measured along the axial direction of the extrusion. Suitable geometries for composite pellets of the present application are not limited to purely rectangular geometries, but also include generally flat ("substantially planar") cross-sectional geometries produced by extrusion through a suitably shaped orifice, including but not limited to the various embodiments shown in FIG. 1.

The terms "controlled geometry pellet", "controlled geometry micropellet", "composite pellet", and "controlled aspect ratio pellets" are used in the present application interchangeably, and refer to a pellet of the present application.

The terms "particle" and "particulate" are used herein to describe shaped materials that are not a controlled geometry pellet but are of a size that would permit incorporation into a controlled geometry pellet, e.g., a material such as a carbon or glass fiber.

The term "rectangular envelope" as used herein describes a rectangle within which another geometric shape, such as, for example, an ellipse, a triangle, a hexagon, or an oblate ellipse, can be inscribed such that the rectangle and the other geometric cross-sectional shape have the same aspect ratio. The rectangular envelope is drawn such that the rectangle has the thinnest possible shape, i.e., the width of the rectangle "W" is minimized. The term "rectangular envelope" may be used to characterize the cross-sectional shape of a generally planar face of the present controlled geometry pellets, e.g., to characterize a die-face cross-sectional shape of the present controlled geometry pellets.

The term "aspect ratio" may be used herein to refer to the ratio of the width ("W") of a pellet's cross-sectional rectangular envelope to its height ("T", i.e., the thickness of the pellet's cross-sectional rectangular envelope), "W:T." Where the rectangular envelope refers to the cross-sectional shape of the face of the pellet of his ratio is referred to herein as the "cross-sectional aspect ratio."

The term "aspect ratio" may also be used to refer to the ratio of the length of the extruded pellet in the axial direction ("L"; i.e., the length in the direction of the major axis of the extruder) to width ("W") of a pellet's die cross-sectional rectangular envelope. To help avoid confusion this ratio, "L:W," may be referred to herein as the "axial length/cross sectional width ratio."

The term "die-face cross-sectional shape" may be used herein to refer to the shape of the pellet face(s) produced by extrusion through a suitably shaped orifice—as opposed to the shape of the pellet along its axial length, i.e., along the axial direction of the extrusion.

The present composite pellets may have unique physical characteristics. The pellets can include a die-face cross-sectional shape having a rectangular envelope with an aspect ratio of at least about 1.5 and an axial length/cross sectional width ratio of about 0.25 to 30. Such pellets may find utility in a variety of applications. For example, the pellets can be used in compression molding processes, where such pellets can provide an alternative to the use of thermoplastic polymer powders and mixtures of polymers powders with dry fibers. The present composite pellets can be used in compression molding processes in conjunction with polymer powders. The controlled geometry pellets may be used to manufacture shaped articles with enhanced physical properties, such as, for example, impact strength, tensile strength, tensile elongation, tensile modulus, flexural strength and/or flexural modulus, superior to those of similarly-shaped articles formed either solely from polymer powders or mixtures of polymers powders with dry fibers with the same chemical composition as the pellets. The pellets may also be amenable to use in other processing methods including, for example, injection molding and extrusion operations. Other applications for composite pellets of the present application can include, for example, the use of composite pellets as color concentrates, fragrance concentrates, grinding or polishing media, or filter media.

The shape of the cross section of the pellets used for compression molding can affect the physical characteristics of the molded article as well as the ease of processing. For example, pellets having substantially rectangular cross-sections can be well suited for use in controlled geometry pellet ("CGP") compression molding operations, i.e., compression molding carried out using composite pellets of the present application.

Referring to FIG. 1, examples of exemplary die cross sectional shapes of composite pellets of the present application that are A) rectangular, B) elliptical, C) triangular, D) hexagonal, and E) oblate elliptical are shown. The dashed lines in FIGS. 1B-1E represent the perimeter of a rectangle that can envelop each of these shapes, i.e., the rectangular envelope. The rectangular envelope is identical for each shape, 1A-1E, creating a W:T ratio ("cross-sectional aspect ratio") of 8:1 for each of the cross-sectional shapes shown.

The composite pellets employed in the present compression molding methods, regardless of their specific cross sectional shape, commonly have a cross sectional aspect ratio (W:T) of at least about 1.5:1 and, typically no more than about 30:1. In some embodiments, the aspect ratio of W:T can be 2:1 to 15:1 or about 2:1 to 10:1. In other embodiments, the cross sectional aspect ratio of the pellets may be about 2:1 to 5:1.

TABLE 1

Dimensions of Dies for
Preparation of Composite Pellets

| Die | Die Dimensions | | |
|---|---|---|---|
| Multi-Geometry | | | |
| Rectangle 1 (R1) | T = 1.07 mm | W = 2.0 mm | AL = 0.76-2.3 mm |
| Rectangle 2 (R2) | T = 1.07 mm | W = 2.0 mm | AL = 0.76-2.3 mm |
| Rectangle 3 (R3) | T = 1.07 mm | W = 3.0 mm | AL = 0.76-2.3 mm |
| Rectangle 4 (R4) | T = 1.07 mm | W = 3.0 mm | AL = 0.76-2.3 mm |

TABLE 1-continued

Dimensions of Dies for Preparation of Composite Pellets

| Die | Die Dimensions | | |
|---|---|---|---|
| Circle 1 (C1) | Diam. = 1.9 mm | | AL = 0.76-2.3 mm |
| Circle 2 (C2) | Diam. = 1.9 mm | | AL = 0.76-2.3 mm |
| "T" hole | W1 = 2.5 mm | W2 = 1.9 mm | AL = 0.76-2.3 mm |
| Other Dies | | | |
| Rectangle 5 (R5) | T = 1.1 mm | W = 2.3 mm | AL = 1.1-2.3 mm |

The axial length/cross sectional width ratio (L:W) of the present pellets is often desirably about 0.25:1 to 30:1. In some embodiments, the L:W maybe 0.5:1 to 10:1. Dimensions of exemplary rectangular dies suitable for use in forming the present composite pellets are among the various dies listed in Table 1.

A potential advantage of the above-described aspect ratios and geometries for composite pellets when used in compression molding may be that the pellets can easily pack together even with little or no agitation, pressure, or temperature applied. When placed in a container, such as a compression molding tool or other vessel, these materials will typically have a porosity of about 55% or less without the application of pressure or elevated temperatures. Due to this relatively low porosity when the material is introduced into the compression molding tool, less axial displacement of the two (or more) parts of the tool is commonly required. Reducing the axial displacement required for compaction provides an advantage not only in producing parts with lower porosity, but also in that it can allow larger parts to be produced on a given molding press as compared to conventional compression molding techniques, such as produced from powdered polymers and blends of powdered polymers with other fillers.

The "porosity" of a plurality of the present pellets in a container of fixed dimensions is a reflection of the capability of individual pellets to pack closely together without generating a large void volume. This capability can also be characterized in terms of the "compression factor" of the pellets. As used herein, the term "compression factor" refers to the ratio of initial to final volume when a 10" high volume of the present thermoplastic resin-based pellets are compression molded in a 4.5"OD×3" ID tubular mold under a pressure of 170 bar (circa 2500 psi) at a temperature 20° C. above the melting point of the thermoplastic resin. Thus, a compression factor of 3.3 (such as typically observed when powder forms of thermoplastic resins are employed in compression molding operations) would mean that the initial 10 inch high volume of pellets in the mold was compacted to form a roughly 3 inch high tubular article at the end of the compression molding operation under the conditions set forth above. The present controlled geometry pellets are often characterized by having a compression factor of no more than about 2.5, desirably no more than about 2.2 and, in some embodiments, no more than about 2.0. This can permit parts of about 5 inches in height or higher to be produced from the initial 10 inch high volume of uncompressed pellets.

The use of the present controlled geometry pellets may include use in compression molding operations using pellets having a single cross sectional geometry. In other embodiments, pellets of such geometries may be employed in conjunction with other pellet geometries and/or particle geometries, regardless of whether the additional pellet or particle shapes meet the aspect ratio definitions described earlier. For instance, the combination of multiple sizes and/or shapes of controlled geometry pellets may perform as well or better than a single size or shape. Typically, at least about 40 wt. % and often 50 wt. % or more of the thermoplastic composite material employed in a molding operation is comprised of the present controlled geometry pellets. This includes combining controlled geometry pellets with standard shaped pellets and/or powders, which may provide the same type of benefits as the exclusive use of controlled geometry pellets.

In some embodiments, the composite pellets can have a thickness ("T") of about 0.005" to about 0.20" (circa 0.13 mm to 5 mm). In other embodiments, the composite pellet can have a thickness ("T") of about 0.010" to about 0.12" (about 0.25 mm to 3 mm), where the length and width of the pellets conform to the aspect ratios described above. Composite pellets having a thickness of about 0.020" to 0.080" (about 0.5 mm to 2 mm) are quite commonly employed in the present compression molding operations.

To create a relatively short melting time for the controlled geometry pellets, the weight of the pellets may desirably be relatively low. For example, pellets weighing no more than about 30 mg may be quite suitable and, in many instances, the present pellets may weigh no more than about 10 mg. Pellets weighing 5 mg or less are often quite suitable for use in the present methods.

When fiber-reinforced controlled geometry pellets with the aspect ratio defined in this application are used to produce articles with fiber reinforcements, they will have fiber orientation predominantly, but not exclusively, in the length dimension of the controlled geometry pellets. When subsequently compression molded, the fiber direction can be predominantly in the plane perpendicular to the axial direction of compression. In that direction, the fibers can have an overall random orientation. This results in articles of manufacture with exceptional mechanical properties in that plane. By controlling the various aspect ratios of length, width, and thickness, the degree of orientation can be controlled and both mechanical properties and dimensional stability can be tailored for specific applications.

Despite one plane (the L:W plane) generally having the predominant fiber orientation, the overall random nature of the fiber alignment is believed to result in articles of manufacture with very good dimensional stability. The lower temperatures and pressures typically required to compression mold the present controlled geometry pellets may also provide additional benefit to dimensional stability in a variety of articles of manufacture, e.g., by reducing molded in stress. The compression molding operation may suitably be carried out under pressures in the range of about 1,500 to 20,000 psi.

Thermoplastic polymeric resins suitable for use in composite pellets of the present application include, for example, polyetheretherketone ("PEEK"), polyetherimide ("PEI"), polyethersulfone ("PES"), poly(arylene sulfide) ("PAS"), perfluoro alkyl vinyl ether ("PFA"), polyethylene naphthalate ("PEN"); polyamideimide ("PAI"), polyphthalamide ("PPA"), thermoplastic polyimide resin ("TPI"), polyether ketone ("PEK"), polyetherketoneketone ("PEKK"), polyetherketoneetherketoneketone ("PEKEKK"), polybenzimidazole ("PBI"), and mixtures of two or more of these resins. In some embodiments, the thermoplastic, organic polymer includes polyetheretherketone, polyarylene sulfide, polyetherimide, or a blend of any two or more such materials. For example, the thermoplastic polymer may include an aromatic polyetheretherketone, such as an oxyaryloxyaryloxyaroyl type polyetheretherketone, e.g., an oxyphenoxyphenoxybenzoyl polyetheretherketone. PEEK and other poly arylether/arylketones (such as polyetherketones and polyetherketoneketones) are well known and are described in patents such as EP 0 001 879, U.S. Pat. Nos. 6,909,015, and 6,274,770. In other embodiments, the polymeric resin includes polyarylene sulfide, e.g., polyphenylene sulfide ("PPS"), either alone or in combination with another thermoplastic polymeric resin(s). Other examples of suitable resins include thermoplastic polyolefins, such as polypropylene ("PP"), polyethylenes, e.g., high density polyethylene ("HDPE") and ultrahigh molecular weight polyethylene ("UHMWPE"), melt processable fluoropolymers, such as perfluoro alkyl vinyl ethers ("PFA") and ethylene trifluoroethylene copolymers ("ETFE"), ethylene trichloroethylene ("ECTFE"), polyethylene naphthalate, polyamideimide ("PAI"), polyphthalamide ("PPA"), thermoplastic polyimide resin ("TPI"), polybenzimidazole ("PBI"), polyamides (including but not limited to nylon 6, nylon 6/6, nylon 11, nylon 12, nylon 6/12), polycarbonates, and polyesters (including but not limited to polyalkylene terephthalates, such as polybutylene terephthalate (PBT) and polyethylene terephthalate (PET)). The thermoplastic resin may include mixtures of two or more of the resins discussed above. In some embodiments, the thermoplastic, organic polymer includes polyetheretherketone, polyarylene sulfide, polyetherimide, or a blend of any two or more such materials. For example, the thermoplastic polymer may include an aromatic polyetheretherketone such as oxyaryloxyaryloxyaroyl polyetheretherketone, e.g., oxyphenoxyphenoxybenzoyl polyetheretherketone. PEEK and other similar polyetherketones (such as polyetherketoneketones) are well known and are described in patents such as EP 0001879, U.S. Pat. Nos. 6,909,015, and 6,274,770. In other embodiments, the polymeric resin includes polyarylene sulfide, e.g., polyphenylene sulfide ("PPS"), either alone or in combination with another thermoplastic polymeric resin(s).

The thermoplastic polymeric resin may be present in the composite pellets from about 30 wt % to 98 wt % in some embodiments, from about 50 wt % to 95 wt % in other embodiments. In many embodiments, the composite material includes about 60 wt % to 90 wt % of the thermoplastic polymeric resin or from about 60 wt % to 80 wt % in yet other embodiments.

In some embodiments, the thermoplastic polymer suitably includes a polyetheretherketone (PEEK), such as an oxyphenoxyphenoxybenzoyl polyetheretherketone, e.g., a polyetheretherketone, which includes oxy-1,4-phenylene-oxy-1,4-phenylene-carbonyl-1,4-phenylene repeat units. Aromatic polyetheretherketones, such as oxyphenoxyphenoxybenzoyl polyetheretherketone, may typically be processed via extrusion at polymer temperatures of about 360° C. to 400° C. to form pellets. A suitable example of such polymers are commercially available as a powder and in a number of other grades and forms ranging from low medium and standard viscosity grades to easy flow and general purpose grades. PEEK polymers may be used in extrusion compounding and commonly exhibits good wear resistance, low friction, and good chemical resistance, such as resistance to various fuels and other hydrocarbons.

In some embodiments, the composite pellets may include a blend of thermoplastic polymeric resin and reinforcing particulates. Reinforcing particulates, e.g., fibers or flakes, suitable for use in composite pellets of the present application can include, for example, fibers or flakes formed from materials such as carbon, silicon, boron, aramid, silicon oxide, silicon carbide, silicon nitride, and/or alumina.

Reinforcing particulates in shapes such as, for example, fibers, milled fibers, whiskers, granules, grains, powders, or flakes can be used in compositions and methods of the present application. In some embodiments, reinforcing particulates can be fibers. In some embodiments, the fiber may be present in the composite pellets from 2 wt % to about 60 wt %, from about 5 wt % to 50 wt % in other embodiments, or from about 10 wt % to 40 wt %, in yet other embodiments. In some embodiments, the reinforcing particulates can suitably comprise glass fiber, carbon fiber (e.g., milled carbon fiber and/or chopped carbon fiber), or a combination thereof. The glass fiber may also suitably include milled and/or chopped glass fiber. Other examples of suitable reinforcing particulates include glass flakes and/or glass spheres. In some embodiments, the milled carbon fiber can have a diameter of about 5 to 20 microns and an aspect ratio of about 5 to 50 and, in certain embodiments, about 10 to 30. In other embodiments, chopped carbon fibers can have a diameter of about 5 to 20 microns and an aspect ratio of at least about 50, e.g., about 100 to 200. In still other embodiments, the reinforcing particulates may include glass fibers (chopped and/or milled fibers), glass flakes and/or spherical glass particles. In some embodiments, the reinforcing particulates may desirably have a largest dimension which is no more than about 90% of the largest pellet dimension. In certain embodiments, the reinforcing particulates may desirably have a largest dimension which is no more than about 90% of the width of the die cross-sectional shape used to generate the pellet in an extrusion operation.

Methods of preparing the composite pellets are also provided. The methods can include blending the ingredients that will form the composite pellets, melting the thermoplastic component(s) and processing the resulting mixture containing the molten thermoplastic component(s) so as to wet out reinforcing particulates present in the mixture with the thermoplastic material. Such a processing operation typically results in distributing and dispersing reinforcing particulates in the thermoplastic component(s). Such methods may include blending the ingredients and extruding the mixture through a die that produces composite that is cut to provide composite pellets with a die cross-sectional shape having a rectangular envelope with an aspect ratio ("W:T") of at least about 1.5 and an axial length/cross sectional width ratio ("L:W") of about 0.25 to 30.

Alternatively, the methods may include several steps with the various ingredients being added at any given point in the process. For example, a first amount of a thermoplastic polymeric resin may be compounded with reinforcing particulates in an extruder to produce a first extrudate. The first extrudate may then be blended with another additive, such as, for example, a flame retardant, a lubricant, a conductive additive thermally and/or electrically conductive) a micro-tag, a colorant, or a fragrance, and subjected to a second extrusion to produce a second extrudate that is cut to provide a composite pellet with a cross-sectional shape having a rectangular envelope with an aspect ratio (W:T) of at least about 1.5 and an axial length/cross sectional width ratio (L:W) of about 0.25 to 30. Compounding may take place in a single screw, twin screw, or other style extruder. The methods may also include introducing the ingredients of any particular stage of the operation, e.g., prior to being fed to the extruder and/or at intermediate stages of the extrusion process.

In preparing the composite pellets, the same thermoplastic polymeric resin may be used in the preparation of both the first and second extrudates, or different thermoplastic polymeric resins may be used. If different thermoplastic polymers are used in the steps, they may be chemically distinct polymers, or just different grades of the same polymer having varying viscosities, melt indices, or other polymeric properties.

After molded articles have been formed from controlled geometry pellets, the molded articles can be machined by various methods known to one skilled in the art, such as, for example, drilling, turning, chip formation, and combinations of machining methods.

The present invention, thus generally described, will be understood more readily by reference to the following examples, which are provided by way of illustration and are not intended to be limiting of the present invention.

Experimental

Materials. The carbon fiber ("CF") used to make the composites referred to in the following tables was a commercially available milled carbon fiber approximately 5-10 microns in diameter and having an average length of about 100 to 300 microns, i.e., having an aspect ration of about 10 to 60. The polyetheretherketone ("PEEK") used in the experimental trials referred to in the following tables was a commercially available phenoxyphenoxybenzoyl polyetheretherketone. Extruded compositions were prepared by compounding the PEEK with the carbon fiber in a single or twin screw extruder to form 30 wt. % CF in PEEK pellets of the indicated size and shape. After extrusion through dies similar to the geometry described in Table 1 and cooling, the compounded materials, were cut to the desired length, e.g., pellets with an axial dimension ("axial length") of about 0.75 to 2.5 mm.

thermore, in compression molding with the controlled geometry pellets, the need for mixing powder resins with reinforcing fillers as a separate manufacturing step is eliminated, as the controlled geometry pellets are provided to the customer already melt compounded. The controlled geometry pellets can also be dried more effectively in desiccant hopper dryers utilizing forced convection, a process that cannot be used with polymer powder/fiber mixtures which must instead be dried in ovens with little to no convection that do not remove as much moisture as the forced convection dryers. The better-dried controlled geometry pellets can eliminate incidences of porosity due to humidity being trapped in the powdered blends, humidity not present in micro pellets dried in desiccant dryers; this effectively increases yield and economics in the compression molding of shapes.

Typical compression molding grade compounds are powder mechanical blends blended in high intensity mixers. When powder resin/dry fiber mixtures are used, the polymer and fibrous reinforcements are wetted only during the compression molding process when the polymer melts, thus not providing effective and complete fiber or filler wet out which is crucial for obtaining uniform properties of the molded article. Powdered blends yields lower mechanical strength than melt compounded controlled geometry pellets. Further-

TABLE 2

Physical Properties - Compression Molded Articles

| Property | ASTM TEST | 30% Carbon Fiber PEEK - CGP* Compression Molded | 30% Dry CF Mix w/ PEEK Powder Compression Molded | Improvement w/ CGP Technology | Commercial PEEK Pellets w/ 30% CF Extrusion | Improvement w/ CGP Technology |
|---|---|---|---|---|---|---|
| Specific gravity | D972 | 1.41 | 1.42 | | 1.41 | |
| Impact Strength Izod Notched 1/8" | D256 | 1.55 ft-Lb/in | 1.03 ft-Lb/in | 49.8% | 1.12 ft-Lb/in | 38.3% |
| Tensile Strength | D638 | 19,475 | 14,000 | 39.0% | 19,000 | 2.5% |
| Tensile Elongation | D638 | 5.93 | 2 | 195.0% | 5 | 18.6% |
| Tensile Modulus | D638 | 2,078,550 | 800,000 | 159.0% | 1,100,000 | 88.0% |
| Flexural Strength | D790 | 35,631 | 30,000 | 18.7% | 25,750 | 38.0% |
| Flexural Modulus | D790 | 1,327,247 | 1,300,000 | 2.0% | 1,250,000 | 6.0% |
| Volume Resistivity | D257 | 1E5 ohm · cm | 1E5 ohm · cm | | 1E5 ohm · cm | — |
| Deflection Temperature | D648 | 600° F. | 450° F. | +150° F. | 518° F. | +132° F. |
| Flammability | D3801 | V-O @1/16 in | V-O @1/16 in | | V-O @1/16 in | |

*CGP—"controlled geometry pellets".

The results of various tests of physical properties of compression molded articles prepared with 30% CF/PEEK controlled geometry pellets (shown in Table 2) are compared to tests of the physical properties for articles prepared from PEEK by (a) compression molding a mixture of a powdered form of PEEK with 30% dry CF and (b) extrusion of standard cylindrical shaped 30% CF/PEEK pellets. The articles materials formed from the present controlled geometry pellets were prepared from CF/PEEK composite pellets having the cross sectional geometries listed in Table 1.

The PEEK controlled geometry pellets can be compression molded, injection molded, and extruded to form stock shapes. These positive characteristics allow for a processor with multiple processes to simplify their inventory management. Furmore due to the fact that the powdered blends are a mechanical blend the compounds suffer from settling and ingredient separation during transportation, warehouse operations and prior to the molding process taking place. This forces the user of the powdered blends to have to re-blend the compounds just prior to drying and molding; controlled geometry pellets of the present application eliminate this step, further reducing manufacturing costs. An issue of rejected moldings due to ingredient separation and/or migration can often be totally eliminated using the present controlled geometry pellets, thus increasing yield.

High performance thermoplastic stock shapes compression molded from controlled geometry pellets can reduce the cost of manufacturing, increase yield and result in higher properties due to the fibers being pre-wetted with polymer before the actual compression molding process. Articles formed by compression molding the present controlled geometry pellets can provide an increase in tensile and flexural properties of more than 50% when compared to the same product when molded from a typical powdered blend, as shown in Table 2. The compression molded PEEK controlled geometry pellets can have mechanical properties as good as or better than extruded shapes. This is a novelty since extruded shapes normally would have higher mechanical properties than compression molded shapes. This demonstrates the potential advantages of controlled geometry pellets. Properties observed in compression molded articles prepared by two different groups with two different compression molding techniques exhibited very similar properties with only slight statistical variation, demonstrating a very uniform product more forgiving than articles formed from powdered thermoplastic blends.

The pellets can also be injection molded with lower stock temperatures as the pellets offer faster screw recovery of the injection molding machine. The controlled geometry pellets can be made with relatively smaller milled fibers, this and the lower stock temperatures produce injection molded shapes with much lower stress than shapes molded with standard pellets. The benefit of this is that the pellets can allow for the machining and fabrication of very tight tolerance components that do not twist or change dimensions during machining and during service. This can also apply to extruded shapes manufactured from the present pellets.

Compression molded shapes made from controlled geometry pellets can exhibit higher mechanical strength this allowing for the use of compression molded shapes of PEEK in applications not previously possible with molded shapes derived from powdered blends, such as in the case of PEEK-based turbo compressor labyrinth seals requiring higher performance for service temperatures above 350° F.

Illustrative Embodiments

Reference is made in the following to illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods materials and coatings described herein.

One embodiment provides composite pellets comprising thermoplastic polymeric resin and reinforcing particulates having a largest dimension which is no more than about 90% of the largest pellet dimension. The composite pellets may have a cross sectional shape having a rectangular envelope with an aspect ratio (W:T) of at least about 1.5 and an axial length/cross sectional width ratio (L:W) of about 0.25 to 30. The composite pellets can have a thickness of about 0.1 to 8 mm (circa 0.5-3 mm). The composite pellets may have a cross sectional shape having a rectangular envelope with an aspect ratio of about 1. 5 to 10 and an axial length/cross sectional width ratio of about 0.25 to 5. The composite pellets may have a cross sectional shape having a rectangular envelope with an aspect ratio of about 2 to 5 and an axial length/cross sectional width ratio of about 0.5 to 3. The composite pellets often have a substantially rectangular cross sectional shape. In other embodiments, the composite pellets may have a flattened triangular cross sectional shape, a flattened hexagonal cross sectional shape and/or an elliptical cross sectional shape. In certain instances, the pellets have an average weight of about 1 to 20 mg and, often, no more than about 10 mg. Such pellets may have a rectangular cross sectional shape with an aspect ratio of about 2 to 5; an axial length/cross sectional width ratio of about 0.5 to 2; a thickness of about 0.5 to 2 mm; a width of about 1 to 5 mm; and/or an axial length of about 1 to 5 mm. Such composite pellets typically comprise about 50 to 90 wt. % of the thermoplastic polymeric resin; and about 10 to 50 wt. % of the reinforcing particulates. The reinforcing particulates comprise fibers may have an average length of about 0.05 to 3 mm. In many embodiments, the composite pellets have a compression factor of no more than about 2.2 and the compression factor may be 2.0 or less.

Composite pellets comprising thermoplastic polymeric resin; and reinforcing particulates having a largest dimension which is no more than about 90% of the largest pellet dimension; wherein the composite pellets have a cross sectional shape having a rectangular envelope with an aspect ratio (W:T) of at least about 1.5 and an axial length/cross sectional width ratio (L:W) of about 0.25 to 30, more commonly about 0.25 to 5.

Composite pellets comprising thermoplastic polymeric resin; and a plurality of randomly oriented reinforcing fibers; wherein the composite pellets have a thickness of no more than about 2 mm; a cross sectional shape having a rectangular envelope with an aspect ratio (W:T) of at least about 1.5; and an axial length/cross sectional width ratio (L:W) of about 0.5 to 3. The thermoplastic polymeric resin may include PEEK, PEI, PES, PPS, PAS or a blend of two or more thereof.

Composite pellets comprising about 50 to 90 wt. % thermoplastic polymeric resin; and about 10 to 50 wt. % of a plurality of randomly oriented reinforcing fibers; wherein the composite pellets have a compression factor of no more than about 2.2; a cross sectional shape having a rectangular envelope with an aspect ratio (W:T) of at least about 1.5; and a thickness of about 0.5 to 2 mm. The thermoplastic polymeric resin may include PEEK, PEI, PES, PPS, PAS or a blend of two or more thereof. The randomly oriented reinforcing fibers may include milled and/or chopped carbon fibers.

In one exemplary embodiment, the thermoplastic composite material includes a plurality of controlled geometry pellets, which include thermoplastic organic polymer and a plurality of carbon fibers. The composite pellets exhibit a compression factor of no more than about 2.5. The thermoplastic composite material may include about 60 to 80 wt. % phenoxyphenoxybenzoyl polyetheretherketone as the thermoplastic organic polymer component. In other embodiments, the thermoplastic composite material may include about 60 to 80 wt. % of a blend of phenoxyphenoxybenzoyl polyetheretherketone with one or more other organic thermoplastic polymers.

In some embodiments, the thermoplastic, organic polymer includes polyetheretherketone, polyarylene sulfide, polyetherimide, or a blend of any two or more such materials. For example, the thermoplastic polymer may include an aromatic polyetheretherketone such as aryloxyaryloxyaroyl polyetheretherketone, e.g., 4-(4-phenoxyphenoxy)benzoyl polyetheretherketone. In some embodiments, the thermoplastic polymer may include polyarylene sulfide, such as polyphenylene sulfide, either alone or in combination with one or more other thermoplastic polymers, e.g., polyetheretherketone.

Another embodiment provides a method of manufacturing a shaped article comprising: compression molding thermoplastic resin-based material to provide a molded article; wherein the thermoplastic resin-based material comprises a plurality of controlled geometry pellets, which include thermoplastic polymeric resin and reinforcing particulates; the pellets having an axial length of no more than about 5 mm and a cross sectional shape having a rectangular envelope with an aspect ratio of at least about 1.5. The reinforcing particulates commonly have a largest dimension which is no more than about 90% of the largest pellet dimension.

Another embodiment provides a method of manufacturing a shaped article comprising: compression molding thermoplastic resin-based material to provide a molded article; wherein the thermoplastic resin-based material comprises a plurality of controlled geometry pellets, which include thermoplastic polymeric resin. The pellets may having an axial length of no more than about 5 mm and a cross sectional shape having a rectangular envelope with an aspect ratio of at least 1.5 and, in some instances about 2 to 10. The controlled geometry pellets may also comprise a plurality of reinforcing particulates, e.g., a plurality of randomly oriented glass and/or carbon fibers.

Another embodiment provides a method of manufacturing a shaped article comprising: compression molding thermoplastic resin-based material to provide a molded article. The thermoplastic resin-based material has a compression factor of no more than about 2.2 and comprises a plurality of controlled geometry pellets, which include thermoplastic polymeric resin and reinforcing particulates. The pellets have a cross sectional shape having a rectangular envelope with an aspect ratio of at least 1.5. The reinforcing particulates have a largest dimension which is no more than about 90% of the largest let dimension. The thermoplastic polymeric resin typically comprises polyetheretherketone, polyetherimide, polyethersulfone, polyarylenesulfide and/or, polyphthalamide. The controlled geometry pellets commonly have an average weight of about 1 to 20 mg; and often may have a substantially rectangular cross sectional shape with an aspect ratio of about 2 to 5. The pellets may have an axial length/cross sectional width ratio of about 0.75 to 2 and a thickness of about 0.5 to 2 mm. Such pellets may have a width of about 1 to 5 mm and an axial length of about 1 to 5 mm.

Other embodiments are directed to shaped articles formed by the compression molding methods described herein. Such shaped articles can have an Izod impact strength (notched ⅛") that is at least about 20% higher than a compression molded or extruded article prepared from a corresponding polymer powder and reinforcing fibers. The present compression molded article can have a tensile strength that is at least about 20% higher than a compression molded article prepared from a corresponding polymer powder and reinforcing fibers. The present compression molded article can have a tensile elongation that is at least about 50% higher than a compression molded article prepared from a corresponding polymer powder and reinforcing fibers; and at least about 10% higher than an article formed by extruding a corresponding polymer and reinforcing fiber mixture. The present compression molded article can have a tensile modulus that is at least about 50% higher than a compression molded or extruded article prepared from a corresponding polymer powder and reinforcing fibers. The present compression molded article can have a flexural strength that is at least about 10% higher than a compression molded or extruded article prepared from a corresponding polymer powder and reinforcing fibers.

Another embodiment provides composite pellets comprising thermoplastic polymeric resin and reinforcing particulates having a largest dimension which is no more than about 90% of the largest pellet dimension. The composite pellets have a cross sectional shape having a rectangular envelope with an aspect ratio (W:T) of about 2 to 10 and an axial length/cross sectional width ratio (L:W) of about 0.5 to 3. The composite pellets have a compression factor of no more than about 2.2. The pellets may have a thickness of about 0.25 to 2 mm and a length of no more than about 3 mm. The pellets typically include 50 to 90 wt. % thermoplastic polymeric resin; and about 10 to 50 wt. % of a plurality of randomly oriented reinforcing fibers. The thermoplastic polymeric resin commonly comprises polyetheretherketone, polyetherimide, polyethersulfone, polyarylenesulfide, polyphthalamide or a combination thereof. The randomly oriented reinforcing fibers may include carbon fibers, e.g., milled and/or chopped fibers. Such fibers may have a diameter of about 5 to 20 microns and an aspect ratio of about 10 to 200.

In certain embodiments, the composite pellets may suitably have a rectangular box shape (i.e., a right rectangular prism or cuboid shape). Such composite pellets may have at least two opposing generally flat faces, which have a rectangular cross sectional shape with an aspect ratio of at least about 1.5. The other faces of the rectangular box shape may have a rectangular cross sectional shape with a similar aspect ratio. In some instances, one or more pairs of opposing faces may have a substantially square cross sectional shape. Such pellets may comprise thermoplastic polymeric resin and reinforcing particulates having a largest dimension which is no more than about 90% of the largest pellet dimension. In some embodiments, the reinforcing particulates may be fibers, which have a length which is no more than about 90% of the width of the orifice in the die employed to produce such pellet in an extrusion operation.

Another embodiment provides extruded composite pellets which include thermoplastic polymeric resin and a plurality of reinforcing particulates dispersed in the thermoplastic polymeric resin. The composite pellet has at least three substantially planar faces and has an axial length which is no more than about 50% of the largest die-face cross sectional dimension. The reinforcing particulates typically have a largest dimension which is no more than about 90% of the largest pellet dimension.

Another embodiment provides composite pellets which have a rectangular box shape with at least two opposing faces having an aspect ratio of at least about 1.5, commonly 2 or higher, and often desirably about 2 to 5. The composite pellets include thermoplastic polymeric resin and a plurality of reinforcing particulates dispersed in the thermoplastic polymeric resin. The reinforcing particulates generally have a largest dimension which is no more than about 90% of the largest pellet dimension.

For the purposes of this disclosure and unless otherwise specified, "a" or "an" means "one or more." The word "or" when used without a preceding "either" (or other similar language indicating that "or" is unequivocally meant to be exclusive—e.g., only one of x or y, etc.) shall be interpreted to be inclusive, that is "or" when it appears alone shall mean both "and" and "or." Likewise, as used herein, the term "and/or" shall also be interpreted to be inclusive in that the term shall mean both "and" and "or." In situations where "and/or" or "or" are used as a conjunction for a group of three or more items, the group should be interpreted to include one item alone, all of the items together, or any combination or number of the items. Terms used in the specification and claims such as have, having, include, and including should be construed to be synonymous with the terms comprise and comprising.

As used herein, "about" will be understood by persons of ordinary skill in the art and will vary to some extent depending upon the context in which it is used. From about X to Y is intended to mean from about X to about Y, where X and Y are the specified values.

One skilled in the art will readily realize that all ranges discussed can and do necessarily also describe all subranges therein for all purposes and that all such subranges also form part and parcel of this invention.

While several, non-limiting examples have been illustrated and described, it should be understood that changes and modifications can be made therein in accordance with ordinary skill in the art without departing from the invention in its broader aspects as defined in the following claims.

What is claimed is:

1. A method comprising:
   compression molding thermoplastic pellets to provide a molded article,
   wherein the thermoplastic pellets are produced by a method comprising:
   (1) blending a mixture comprising molten thermoplastic resin and particulates in the form of reinforcing fibers;
   (2) extruding the blended mixture through a die orifice with a cross-sectional shape having a rectangular envelope with an aspect ratio of about 1.5:1 to 5:1, wherein the reinforcing fibers have a largest dimension which is no more than about 90% of a width of the die orifice; and
   (3) cutting the extruded mixture to form pellets, each pellet having a pellet fiber orientation predominantly in an axial dimension thereof, each pellet having an axial length to cross-sectional width ratio of about 0.25:1 to 5:1, and each pellet having a pair of opposing substantially planar faces with a cross-sectional shape and aspect ratio derived from the cross-sectional shape of the die orifice,
   wherein each pellet has dimensions and a degree of orientation of the reinforcing fibers which are controlled to provide a molded article fiber orientation predominantly in a plane perpendicular to an axial direction of compression during the compression molding, and
   wherein the molded article fiber orientation has an overall random orientation in the perpendicular plane.

2. The method of claim 1, further comprising machining the molded article.

3. The method of claim 1, wherein the thermoplastic pellets have a compression factor of no more than about 2.2.

4. The method of claim 1, wherein the controlled geometry pellets have an axial length of no more than about 5 mm and a thickness of about 0.25 mm to 3 mm.

5. The method of claim 1, wherein the reinforcing fibers comprise glass fibers and/or carbon fibers.

6. The method of claim 1, wherein the and reinforcing fibers comprise carbon fibers having a diameter of about 5 to 20 microns and an aspect ratio of about 10 to 200.

7. The method of claim 1, wherein the pellets have a die-face cross-sectional area of no more than about 5 mm$^2$.

8. The method of claim 1, wherein the pellets have an axial length to cross-sectional width ratio of about 0.5:1 to 3:1.

9. The method of claim 1, wherein each pellet weighs no more than about 10 mg.

10. The method of claim 1, wherein the pellets have a die-face cross-sectional area of no more than about 5 mm$^2$, an axial length of no more than about 5 mm, a thickness of about 0.25 mm to 3 mm, and a compression factor of no more than about 2.5.

11. The method of claim 1, wherein each pellet comprises about 50 to 90 wt. % of the thermoplastic resin and about 10 to 50 wt. % of the reinforcing fibers.

12. The method of claim 1, wherein the molded article has an impact strength, tensile strength, tensile elongation, tensile modulus, flexural strength and/or flexural modulus which is superior to that of a correspondingly-shaped article formed from a dry mixture of thermoplastic resin powder and reinforcing fibers having the same chemical composition as the pellets.

13. The method of claim 1, wherein the thermoplastic resin-based material comprises polyetherketone, polyetheretherketone, polyphthalamide, polyetherimide, polyarylenesulfide, or a combination thereof.

14. The method of claim 13, wherein the reinforcing fibers have an average length of about 0.05 to 3 mm.

15. The method of claim 14, wherein the thermoplastic pellets have a compression factor of no more than about 2.5.

16. The method of claim 13, wherein the molded article has an impact strength and/or tensile strength which is at least about 20% higher than that of a correspondingly-shaped article formed from a dry mixture of thermoplastic resin powder and reinforcing fibers having the same chemical composition as the pellets.

17. The method of claim 13, wherein the molded article has a tensile elongation and/or tensile modulus which is at least about 50% higher than that of a correspondingly-shaped article formed from a dry mixture of thermoplastic resin powder and reinforcing fibers having the same chemical composition as the pellets.

18. The method of claim 13, wherein the molded article has a flexural strength which is at least about 10% higher than that of a corespondingly-shaped article formed from a dry mixture of thermoplastic resin powder and reinforcing fibers having the same chemical composition as the pellets.

19. The method of claim 1, wherein the molten thermoplastic resin comprises polyetheretherketone and the reinforcing fibers comprise carbon fibers.

20. The method of claim 1, wherein the molten thermoplastic resin comprises polyarylenesulfide and the reinforcing fibers comprise glass and/or carbon fibers.

* * * * *